Oct. 27, 1931.  E. SCOTT  1,828,877
REFRIGERATING SYSTEM
Filed Sept. 23, 1929
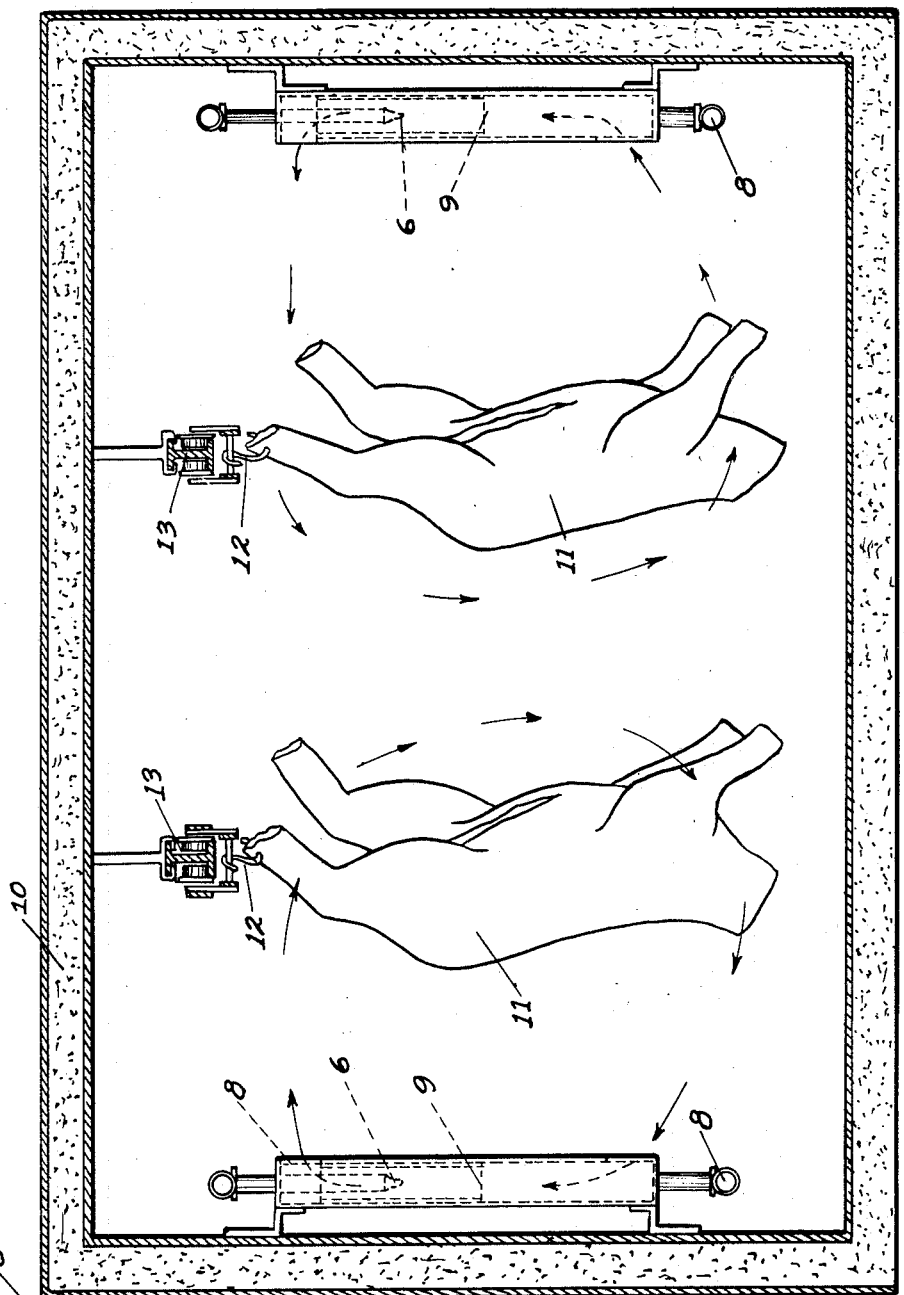
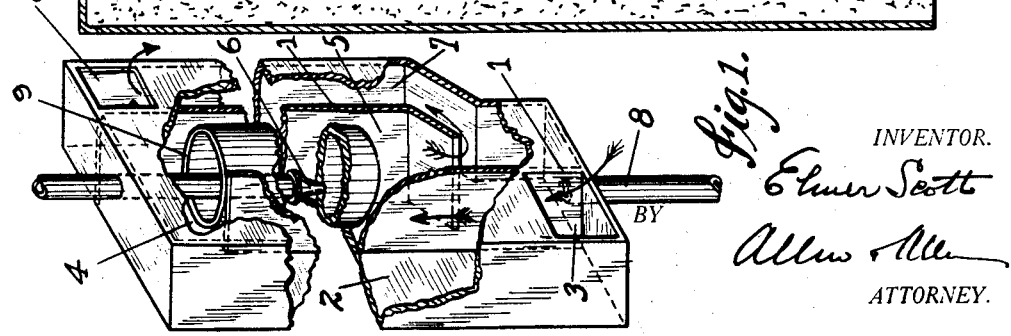
INVENTOR.
Elmer Scott
BY
Allen & Allen
ATTORNEY.

Patented Oct. 27, 1931

1,828,877

UNITED STATES PATENT OFFICE

ELMER SCOTT, OF DAYTON, KENTUCKY

REFRIGERATING SYSTEM

Application filed September 23, 1929. Serial No. 394,462.

My invention relates to refrigerating systems, and particularly to systems for cooling air for refrigerating rooms such as are required for meat storage.

In meat storage rooms a number of different types of refrigerating systems have been suggested. One type of system which is in quite general use is lining the walls of the storage room with pipes through which cold brine is circulated. Air passing in the vicinity of the cold brine pipes is cooled and tends to move down to the lower part of the room, being replaced by warmer air which circulates upwardly. Another system is to provide conduits with a brine spray so arranged in the conduit that air is drawn from the top of the room and is blown inwardly from the walls of the room against the hanging meat. The latter system tends to cause considerable condensation on the ceiling of the room, and the water dripping down has a deleterious effect on the meat. Further, directing blasts of cool air directly against the meat tends to dry it out.

It is the object of my invention to provide a refrigerating system in which condensation on the walls and ceiling of the storage room is avoided. It is also an object to direct currents of cooled air from the side walls of the room close to the ceiling outwardly, so that the air will move in currents down and around the meat and refrigerate it evenly without causing a tendency to dry out.

The above objects and others to which reference will be made in the ensuing disclosure I accomplish by that certain arrangement and combination of parts of which I have shown a preferred modification, with arrows indicating the direction of cooling air currents which I desire to maintain.

In the drawings:—

Figure 1 is a perspective view with parts cut away to show the internal structure of a preferred type of air cooler.

Figure 2 is a sectional view of a refrigerating room showing a preferred arrangement of air coolers and also with arrows indicating the direction of air currents which I maintain in accordance with my system.

I have provided a casing which is sub- divided by walls 1 into three compartments. The first compartment indicated in the drawings at 2 has an air intake opening 3 at the bottom. The wall 1 at the top is cut away so that a space 4 permits the rising air to be drawn downwardly in a central chamber 5 by means of a brine spray pipe 6 which siphons the air downwardly in the chamber 5 and causes it to be forced upwardly in the chamber 7, from which it is blown out at the top through an opening 8. I have indicated a section of pipe 9 within which the spray pipe 6 protrudes in order to increase the siphon effect of the spray. The brine flows out from the central chamber through a discharge pipe 6 from which it is returned to the refrigerating system and circulated through it.

A desired number of these air cooling units are placed along the walls of the refrigerating room, which I have indicated at 10. The meat to be refrigerated, which I have indicated by the carcasses 11, is suspended by means of hooks 12 from tracks 13 which are conveniently arranged so that the carcasses can be moved to and from the refrigerating room. Currents of air being drawn upwardly through the openings 3 are sucked down through the middle compartments and then forced upwardly, discharging out of the openings 8. From the openings 8 the currents pass outwardly toward the top of the meat. Due to being cooler than the surrounding air the currents circulate gently in and around the hanging carcasses, and are gently wafted towards the floor, from which they are again recirculated up through the air cooling devices.

I find that with the system of refrigerating or cooling which I have described, the cold air currents at the top of the room prevent any condensation which would result in water dripping down on to the meat. Further, due to the large space occupied by the gently downwardly wafting currents at the center of the room in and around the meat, there is no tendency for the meat to dry out and become discolored.

While I have shown one type of air cooler which I have found to be entirely practical and economical to construct and maintain, other devices for directing the cooling air currents in accordance with my system may be employed.

Having thus described my invention, what I claim as new and desire to secure by Letters Patent, is:—

1. In a refrigerating system for a meat storage room having means for suspending meat medially of the room, air cooling means having an intake at its bottom, located at the side of the room, said cooling means having air current inducing means for projecting cooling air currents outwardly from the tops of said inducing means toward the top portions of the suspended meat so that it will waft in large volume down around the meat and be drawn in at the bottom of said inducing means.

2. A refrigerating device for meat storage rooms comprising a casing subdivided into vertically arranged compartments, one compartment having intake means at its bottom, a passage connecting said compartment at its top to an adjacent middle compartment having an intake at its top, a passage connecting the bottom of said middle compartment with the bottom of an upwardly extending discharge compartment having an opening at the top thereof, and spray means for cooling and inducing a draft of air currents through said compartments, said spray means located in said middle compartment.

ELMER SCOTT.